US011889595B2

(12) United States Patent
Ohtachi et al.

(10) Patent No.: US 11,889,595 B2
(45) Date of Patent: Jan. 30, 2024

(54) VACUUM PUMP AND HEATING DEVICE THEREFOR (71) Applicant: Edwards Japan Limited, Yachiyo (JP)

(72) Inventors: Yoshinobu Ohtachi, Yachiyo (JP); Yasushi Maejima, Yachiyo (JP); Tsutomu Takaada, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 659 days.

(21) Appl. No.: 16/616,293

(22) PCT Filed: May 23, 2018

(86) PCT No.: PCT/JP2018/019824
§ 371 (c)(1),
(2) Date: Nov. 22, 2019

(87) PCT Pub. No.: WO2018/221345
PCT Pub. Date: Dec. 6, 2018

(65) Prior Publication Data
US 2020/0092952 A1 Mar. 19, 2020

(30) Foreign Application Priority Data
May 30, 2017 (JP) .................................. 2017-106108

(51) Int. Cl.
*F04D 29/58* (2006.01)
*H05B 1/02* (2006.01)
(Continued)

(52) U.S. Cl.
CPC ......... *H05B 1/0244* (2013.01); *F04D 19/042* (2013.01); *F04D 29/58* (2013.01); (Continued)

(58) Field of Classification Search
None
See application file for complete search history.

(56) References Cited

U.S. PATENT DOCUMENTS 1,936,391 A * 11/1933 Harrower ................ H05B 3/00
392/468
4,904,155 A * 2/1990 Nagaoka ............... F04D 29/584
417/423.4
(Continued)

FOREIGN PATENT DOCUMENTS

CN 101375639 A 2/2009
CN 101755481 A 6/2010
(Continued)

OTHER PUBLICATIONS

JPH04201358 translation.*
(Continued)

*Primary Examiner* — J. Todd Newton
*Assistant Examiner* — Wayne A Lambert
(74) *Attorney, Agent, or Firm* — Shumaker & Sieffert, P.A.

(57) ABSTRACT

A vacuum pump suitable for prolonging the life of a heating means used as a measure to prevent product deposition in the vacuum pump, and a heating device for the vacuum pump. A vacuum pump that exhausts gas by rotation of a rotating body has an exhaust flow path for exhausting the gas, and a heating means for heating the exhaust flow path, wherein the heating means has a plurality of resistance heating elements connected in parallel to a pair of wiring lines. The heating means has a current measuring means for measuring a sum of values of currents flowing through the plurality of resistance heating elements, a determination means for determining failure conditions of the plurality of resistance heating elements on the basis of a measured value obtained by the current measuring means, and an output means for outputting the failure conditions determined by the determination means.

9 Claims, 5 Drawing Sheets (51) Int. Cl.
*F04D 19/04* (2006.01)
*F16K 49/00* (2006.01)
*F16L 53/37* (2018.01)
*F16L 53/38* (2018.01)

(52) U.S. Cl.
CPC ............ *F04D 29/584* (2013.01); *F04D 19/04* (2013.01); *F16K 49/002* (2013.01); *F16L 53/37* (2018.01); *F16L 53/38* (2018.01)

(56) References Cited

U.S. PATENT DOCUMENTS

| | | | | |
|---|---|---|---|---|
| 4,926,648 | A | * | 5/1990 | Okumura .............. F04D 19/046 62/55.5 |
| 5,239,614 | A | * | 8/1993 | Ueno ................ H01L 21/67115 219/390 |
| 6,599,108 | B2 | * | 7/2003 | Yamashita .............. F04D 19/04 417/313 |
| 7,417,398 | B2 | * | 8/2008 | Kozaki ................. F04D 29/058 417/423.4 |
| 8,283,608 | B2 | | 10/2012 | Naydenov et al. |
| 8,324,541 | B2 | | 12/2012 | Shirokawa et al. |
| 9,431,944 | B2 | | 8/2016 | Gregg et al. |
| 10,954,962 | B2 | * | 3/2021 | Sakaguchi ............ F04D 29/544 |
| 2002/0094277 | A1 | * | 7/2002 | Gaudet ............... F04D 15/0066 417/44.1 |
| 2010/0187218 | A1 | | 7/2010 | Naydenov et al. |
| 2016/0160877 | A1 | * | 6/2016 | Sakaguchi .............. F04D 19/04 415/177 |
| 2017/0022999 | A1 | * | 1/2017 | Peer ....................... F04D 29/083 |

FOREIGN PATENT DOCUMENTS

| | | | | |
|---|---|---|---|---|
| CN | 101932829 | A | | 12/2010 |
| FI | 65473 | C | * | 5/1984 .............. F16L 53/38 |
| JP | S5438611 | | | 3/1979 |
| JP | S6345755 | A | | 2/1988 |
| JP | H04201358 | A | | 7/1992 |
| JP | H08124866 | A | | 5/1996 |
| JP | H08310030 | A | | 11/1996 |
| JP | 2014095315 | A | | 5/2014 |
| JP | 2015031153 | A | | 2/2015 |
| KR | 20130115450 | A | | 10/2013 |

OTHER PUBLICATIONS

Translation of, the International Search Report dated Aug. 21, 2018, received in counterpart International Application No. PCT/JP2018/019824, 9 pp.
Extended Search Report from counterpart European Application No. 18810257.8, dated Jan. 25, 2021, 8 pp.
Office Action, and translation thereof, from counterpart KR Application No. 1020197033435 dated Aug. 20, 2022, 8 pp.

* cited by examiner

VACUUM PUMP AND HEATING DEVICE THEREFOR

This application is a U.S. national phase application under 37 U.S.C. § 371 of international application number PCT/JP2018/019824 filed on May 23, 2018, which claims the benefit of priority to JP application number 2017-106108 filed May 30, 2017. The entire contents of each of international application number PCT/JP2018/019824 and JP application number 2017-106108 are incorporated herein by reference.

TECHNICAL FIELD

The present disclosure relates to a vacuum pump used as a gas exhaust means for a process chamber or other vacuum chamber in a semiconductor manufacturing apparatus, a flat panel display manufacturing apparatus, and a solar panel manufacturing apparatus, and a heating device for this vacuum pump. The present disclosure is especially suitable for prolonging the life of a heating means used as a measure to prevent product deposition in a vacuum pump.

BACKGROUND

As this type of vacuum pump, the vacuum pump described in, for example, Japanese Patent Application Laid-open No. 2015-31153 has conventionally been known. The vacuum pump disclosed in Japanese Patent Application Laid-open No. 2015-31153 includes a rotating body comprising a rotor (4) and rotor blades (6), wherein gas molecules are transferred from an inlet port to an outlet port (2) by means of the interaction between rotation of the rotating body and a stator member, that is, the interaction between the rotor blades (6) and stator blades (7), as well as the interaction between an outer peripheral surface of the rotor (4) and a thread groove stator (8), thereby exhausting a process gas used in a semiconductor manufacturing apparatus.

Incidentally, sublimable gas contained in the above-mentioned process gas becomes a gas or a solid due to the relationship between the temperature and partial pressure of the gas and easily becomes solidified under a low-temperature environment or a high-partial pressure environment. Therefore, in the vacuum pump disclosed in Japanese Patent Application Laid-open No. 2015-31153, of the entire exhaust flow path for exhausting the gas, a part where the sublimable gas easily becomes solidified, that is, the vicinity of the exit of the exhaust flow path (R2) configured by the outer peripheral surface of the rotor (4) and the thread groove stator (8), is intensively heated by a plurality of resistance heating elements (13).

Figure 6:
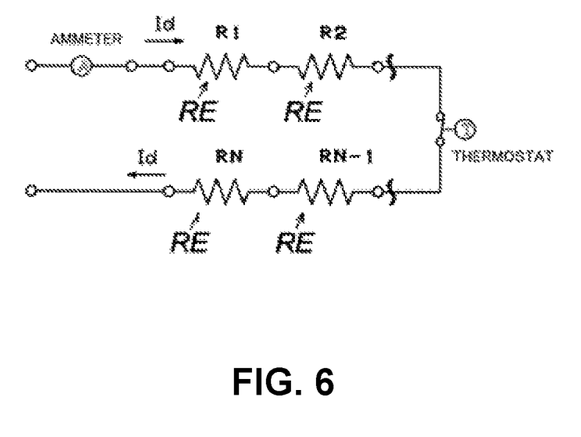
FIG. 6 is an explanatory diagram of an electric circuit configuration of the heating means adopted by the conventional vacuum pump.

However, in this conventional vacuum pump, a specific configuration of the resistance heating elements (13) used for such heating specifically adopts an electric circuit configuration in which a plurality of resistance heating elements RE are connected in series as shown in FIG. 6. A problem with this configuration, therefore, is that in a case of failure such as disconnection in any of the resistance heating elements RE, for example, currents no longer flow through all the resistance heating elements RE, and consequently the operation of the heating means having the plurality of resistance heating elements RE (the operation of heating the vicinity of the exit of the exhaust flow path using the resistance heating elements RE) completely stops or shuts down, resulting in a shortened life of the heating means.

In such a case where the operation of the heating means completely stops or shuts down, the sublimable gas easily becomes solidified in the vicinity of the exit of the exhaust flow path (R2) and the resultant solid product (solidified sublimable gas) accumulates, lowering the exhaust efficiency and making it difficult to keep the exhaust performance of the vacuum pump. Consequently, the operation of a device to be vacuumed by the vacuum pump or, for example, a process apparatus in a semiconductor manufacturing apparatus, may need to be stopped immediately.

In the foregoing description, the reference numerals in the parenthesis represent reference numerals used in Japanese Patent Application Laid-open No. 2015-31153.

SUMMARY

The present disclosure was contrived in order to solve the foregoing problems, and an object thereof is to provide a vacuum pump suitable for prolonging the life of a heating means used as a measure to prevent product deposition in the vacuum pump, and a heating device for the vacuum pump.

In order to achieve this object, the present disclosure provides a vacuum pump that exhausts gas by rotation of a rotating body, the vacuum pump comprising: an exhaust flow path for exhausting the gas; and a heating means for heating the exhaust flow path, wherein the heating means includes a plurality of resistance heating elements connected in parallel to a pair of wiring lines.

The present disclosure may also include a current measuring means for measuring a sum of values of currents flowing through the plurality of resistance heating elements, and a determination means for determining failure conditions of the plurality of resistance heating elements on the basis of a measured value obtained by the current measuring means.

The present disclosure may also include an output means for outputting the failure conditions determined by the determination means.

In the present disclosure, the failure conditions may be the number of faulty resistance heating elements out of the plurality of resistance heating elements.

In the present disclosure, the pair of wiring lines and the plurality of resistance heating elements may be coupled to each other by connectors.

In the present disclosure, both end portions of at least either one of the pair of wiring lines may be coupled by a coupling means.

In addition, the present disclosure is a heating device for a vacuum pump that includes the heating means in the above-mentioned vacuum pump.

According to the present disclosure, specific configurations of the vacuum pump and the heating device therefor adopt the configuration in which the heating means includes the plurality of resistance heating elements connected in parallel to the pair of wiring lines, as described above. Therefore, even if, for example, any one of the plurality of resistance heating elements breaks down, the rest of the heating resistance elements can be operated normally, and the exhaust flow path can constantly be heated by these normal resistance heating elements. Accordingly, owing to the fact that deposition of products in the exhaust flow path can be prevented by such continuous heating, the present disclosure can realize a vacuum pump and a heating device therefor that are suitable for prolonging the life of the heating means used as a measure to prevent product deposition in the vacuum pump.

According to the present disclosure, even if, for example, any one of the resistance heating elements breaks down, the exhaust flow path can constantly be heated, preventing deposition of products in the exhaust flow path, as described above. Therefore, the present disclosure also has the advantage that the operation of a device to be vacuumed by the vacuum pump of the present disclosure, that is, for example, a process apparatus in a semiconductor manufacturing apparatus, can be continued.

DETAILED DESCRIPTION

The best mode for carrying out the present disclosure is now described hereinafter in detail with reference to the accompanying drawings.

Figure 1:
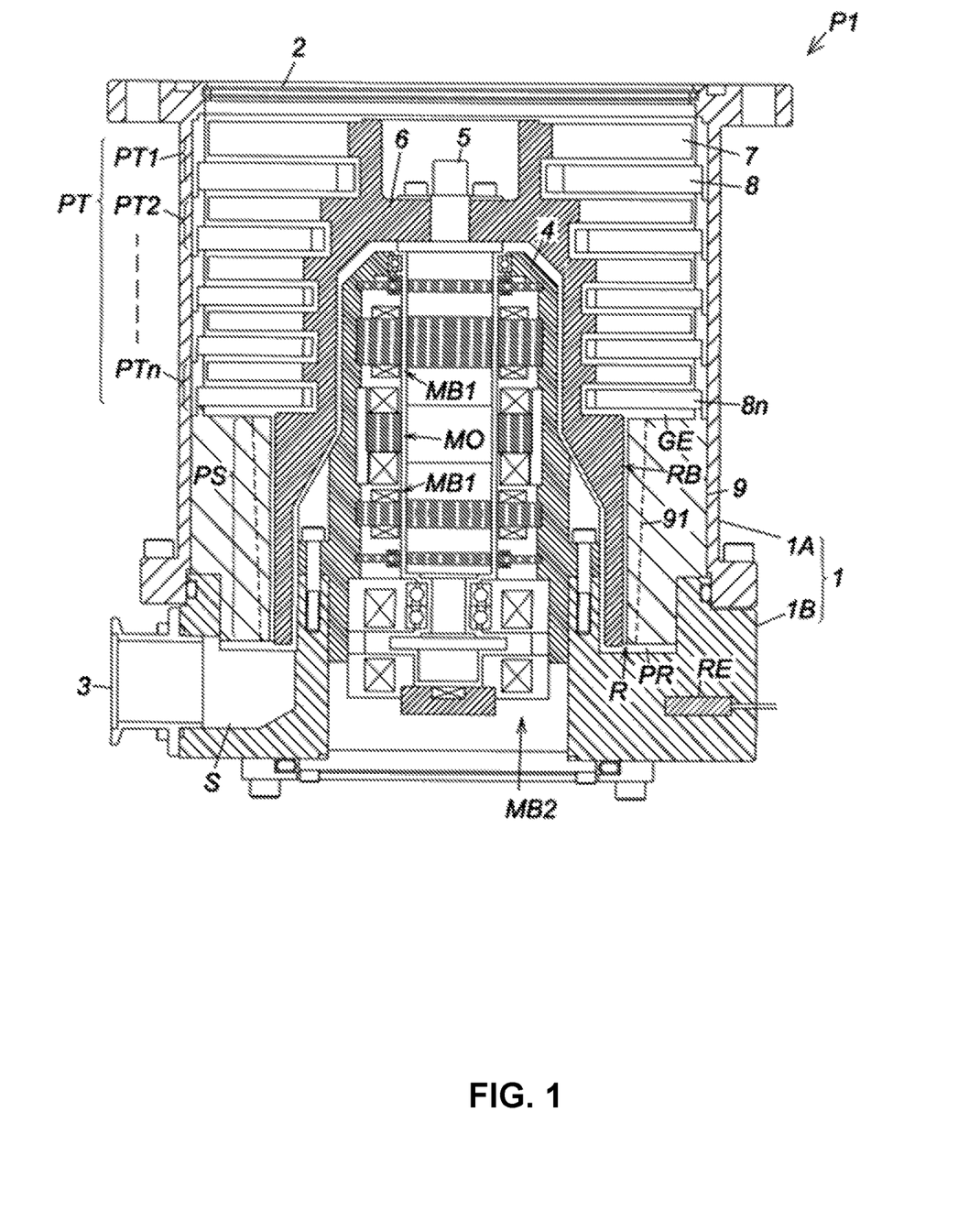
FIG. 1 is a cross-sectional view of a vacuum pump to which the present disclosure is applied.
Figure 2:
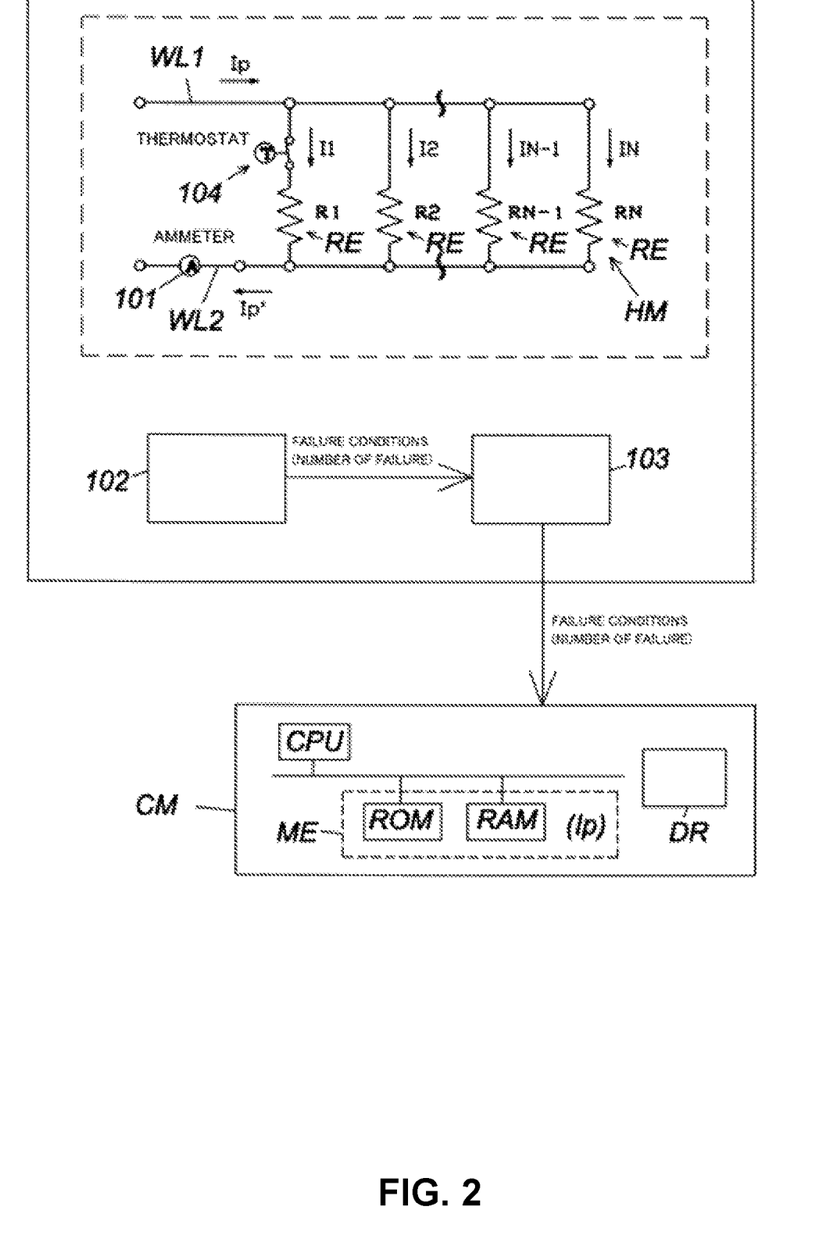
FIG. 2 is a block diagram including an electric circuit configuration of a heating means of the present disclosure.
Figure 3:
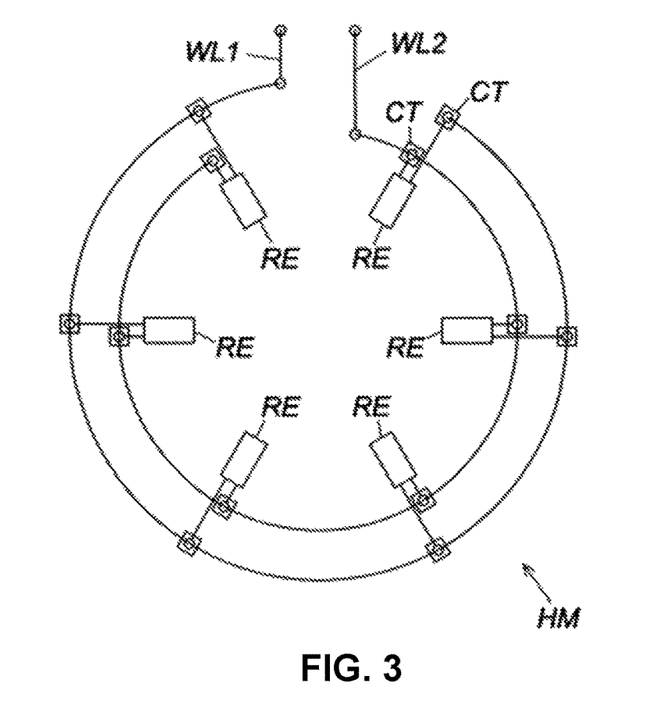
FIG. 3 is a component arrangement diagram of the electric circuit configuration shown in FIG. 2.
Figure 4:
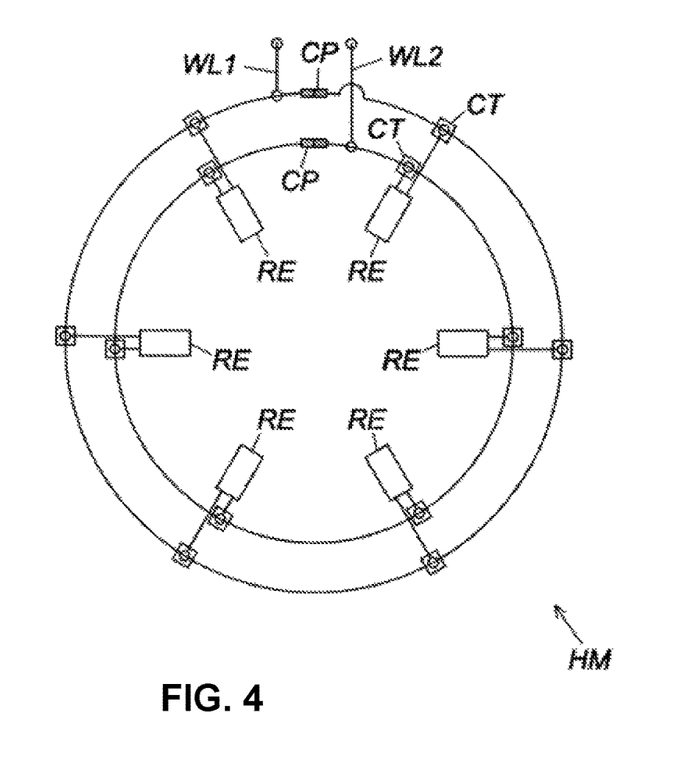
FIG. 4 is a component arrangement diagram of the electric circuit configuration shown in FIG. 2.

FIG. 1 is a cross-sectional view of a vacuum pump to which the present disclosure is applied. FIG. 2 is a block diagram including an electric circuit configuration of a heating means of the present disclosure. FIGS. 3 and 4 are each a component arrangement diagram of the electric circuit configuration shown in FIG. 2.

As shown in FIG. 1, a vacuum pump P1 shown in the diagram includes a casing 1 having a cylindrical cross-sectional shape, a rotating body RB disposed inside the casing 1, a support means for rotatably supporting the rotating body RB, and a drive means for driving the rotating body RB to rotate.

The casing 1 has a bottomed cylindrical shape in which a cylindrical pump case 1A and a bottomed cylindrical pump base 1B are integrally coupled to each other in a cylinder axis direction thereof by fastening bolts. An upper end of the pump case 1A is opened as an inlet port 2 for sucking gas, and a side surface of a lower end of the pump base 1B is provided with an outlet port 3 for exhausting the gas to the outside of the casing 1.

The inlet port 2 is connected to a vacuum chamber (not shown) that is in a high vacuum, such as a process chamber constituting a process apparatus of a semiconductor manufacturing apparatus, via a pressure adjustment valve which is not shown. The outlet port 3 is connected in a communicating manner to an auxiliary pump, not shown.

A cylindrical stator column 4 having various electrical components stored therein is provided in the center of the pump case 1A. In the vacuum pump P1 of FIG. 1, the stator column 4 is formed as a separate component from the pump base 1B and fixed to an inner bottom of the pump base 1B by screws, whereby the stator column 4 is provided upright on the pump base 1B. However, in another embodiment, the stator column 4 may be provided upright integrally on the inner bottom of the pump base 1B.

Inside the pump base 1B are a pair of wiring lines WL1, WL2 (see FIG. 2) and a plurality of resistance heating elements RE (see FIG. 2) provided as components constituting a heating means HM (see FIG. 2). A detailed configuration of the heating means HM is described hereinafter. Note that the place for installing the components constituting the heating means HM is not limited to the pump base 1B and can be changed as needed.

A rotor 6 constituting the rotating body RB is provided outside the stator column 4. The rotor 6 is enclosed in the pump case 1A and the pump base 1B and has a cylindrical shape so as to surround an outer periphery of the stator column 4.

A rotor shaft 5 is provided inside the stator column 4 as a rotation central axis of the rotating body RB. The rotor shaft 5 is disposed in such a manner that an upper end thereof faces the inlet port 2 and a lower end thereof faces the pump base 1B. The rotor shaft 5 is rotatably supported by a magnetic bearing (specifically, two pairs of known radial magnetic bearings MB1 and a pair of known axial magnetic bearings MB2). Furthermore, a drive motor MO is provided inside the stator column 4, and the rotor shaft 5 is driven to rotate about the axis thereof by this drive motor MO.

The upper end of the rotor shaft 5 protrudes upward from a cylindrical upper end surface of the stator column 4, and an upper end of the rotor 6 is integrally fixed to this protruding upper end of the rotor shaft 5 by a fastening means such as bolts. The rotor 6, therefore, is rotatably supported by the magnetic bearings (the radial magnetic bearings MB1, the axial magnetic bearings MB2) via the rotor shaft 5, and when the drive motor MO is started in this supported state, the rotor 6 can rotate integrally with the rotor shaft 5 around its rotor axis.

In other words, in the vacuum pump P1 shown in FIG. 1, the magnetic bearings function as a support means for rotatably supporting the rotor shaft 5 and the rotor 6, and the drive motor MO functions as a drive means for drive the rotor 6 to rotate.

The vacuum pump P1 shown in FIG. 1 also includes, between the inlet port 2 and the outlet port 3, a plurality of exhaust steps PT that function as a means for exhausting gas molecules.

Also in the vacuum pump P1 shown in FIG. 1, a thread groove pump step PS is provided downstream of the plurality of exhaust steps PT, i.e., between the bottom exhaust step PT (PTn) of the plurality of exhaust steps PT and the outlet port 3.

Detailed Configuration of Plurality of Exhaust Steps PT

The upstream side of the vacuum pump P1 of FIG. 1 from substantially the middle of the rotor 6 functions as the plurality of exhaust steps PT. The plurality of exhaust steps PT are described hereinafter in detail.

A plurality of rotor blades 7 rotating integrally with the rotor 6 are provided on an outer peripheral surface of the rotor 6 that is upstream from substantially the middle of the rotor 6, and these rotor blades 7 are arranged radially at predetermined intervals around a rotation central axis of the rotor 6 (specifically, the axis of the rotor shaft 5) or an axis of the casing 1 (referred to as "vacuum pump axis", hereinafter), for the respective exhaust steps PT (PT1, PT2, PTn).

Meanwhile, on the inner peripheral side of the pump case 1A, a plurality of stator blades 8 are provided, and these stator blades 8 are arranged radially at predetermined intervals around the vacuum pump axis, for the respective exhaust steps PT (PT1, PT2, . . . PTn), as with the rotor blades 7.

Specifically, the vacuum pump P1 shown in FIG. 1 has a structure in which the multiple exhaust steps PT (PT1, PT2, . . . PTn) are provided between the inlet port 2 and the outlet port 3 and the plurality of rotor blades 7 and stator blades 8 are arranged radially at predetermined intervals for the respective exhaust steps PT (PT1, PT2, . . . PTn), thereby exhausting the gas molecules.

Each of the rotor blades 7 is a blade-like cut product that is formed, by cutting, integrally with an outer diameter treated portion of the rotor 6, and is inclined at an angle appropriate for exhausting the gas molecules. Each of the stator blades 8 is also inclined at an angle appropriate for exhausting the gas molecules.

Explanation of Exhaust Operation Performed by Plurality of Exhaust Steps PT

Of the plurality of exhaust steps PT configured as described above, at the top exhaust step PT (PT1), the plurality of rotor blades 7 rotates at a high speed integrally with the rotor shaft 5 and the rotor 6 when the drive motor MO is activated. Such rotating rotor blades 7 provides a downward, tangential momentum to the gas molecules that have entered from the inlet port 2, by an inclined surface of each rotor blade 7, which is tilted forward and downward (the direction from the inlet port 2 to the outlet port 3, referred to as "downward", hereinafter) in the direction of rotation of the rotor blades 7. The gas molecules with this downward momentum are sent to the next exhaust step PT (PT2) provided on the corresponding stator blade 8, by the opposite downward inclined surface in the direction of rotation of the rotor blades 7. Further, as with the top exhaust step PT (PT1), at the next exhaust step PT (PT2) and the subsequent exhaust steps PT as well, the momentum is applied to the gas molecules by rotation of the rotor blades 7 and the gas molecules are sent by the stator blades 8, as described above. In this manner, the gas molecules in the vicinity of the inlet port 2 are sequentially shifted and exhausted toward the downstream side of the rotor 6.

Detailed Configuration of Thread Groove Pump Step PS

The downstream side of the vacuum pump P1 of FIG. 1 from substantially the middle of the rotor 6 functions as the thread groove pump step PS. The thread groove pump step PS is described hereinafter in detail.

The thread groove pump step PS includes a thread groove stator 9 as a means for forming a thread groove-like exhaust flow path R at the outer peripheral side of the rotor 6 (specifically, at the outer peripheral side of the downstream part of the rotor 6 from substantially the middle of the rotor 6), and this thread groove stator 9 is attached to an inner periphery of the casing 1 as a stator member.

The thread groove stator 9 is a cylindrical stator member that is disposed in such a manner that an inner peripheral surface thereof faces the outer peripheral surface of the rotor 6. The thread groove stator 9 is also disposed so as to surround the downstream part of the rotor 6 from substantially the middle of the rotor 6.

The downstream part of the rotor 6 from substantially the middle of the rotor 6 is a part where the thread groove pump step PS rotates as a rotating member, and is inserted/stored in the thread groove stator 9, with a predetermined gap therebetween.

A thread groove 91 in a tapered shape, the depth of which decreases toward the bottom, is formed in an inner peripheral portion of the thread groove stator 9. The thread groove 91 is formed in a spiral shape from an upper end to a lower end of the thread groove stator 9.

The exhaust flow path R for exhausting the gas is formed on the outer peripheral side of the rotor 6 by the thread groove stator 9 having the thread groove 91 described above. Although not shown, the exhaust flow path R described above may be provided by forming the thread groove 91 described above in the outer peripheral surface of the rotor 6.

In the thread groove pump step PS, since the gas is compressed and transferred by the thread groove 91 and the drag effect on the outer peripheral surface of the rotor 6, the depth of the thread groove 91 is set to be the deepest at the upstream entrance side (a flow path opening end in the vicinity of the inlet port 2) of the exhaust flow path R and the shallowest at the downstream exit side (a flow path opening end in the vicinity of the outlet port 3).

The entrance of the exhaust flow path R (the upstream open end) is opened toward a gap between a stator blade 8$n$ constituting the bottom exhaust step PTn and the thread groove stator 9 (referred to as "final gap GE", hereinafter), whereas the exit of the exhaust flow path R (the downstream open end) is communicated with the outlet port 3 through an in-pump outlet port side flow path PR.

By providing a predetermined gap between the lower end of the rotor 6 or the thread groove stator 9 and the inner bottom portion of the pump base 1B (a gap going once circle around a lower outer periphery of the stator column 4, in the vacuum pump P1 shown in FIG. 1), the in-pump outlet port side flow path PR is formed so as to extend from the exit of the exhaust flow path R to the outlet port 3.

Explanation of Exhaust Operation of Thread Groove Pump Step PS

The gas molecules that reach the final gap GE by being transferred by the exhaust operation by the plurality of exhaust steps PT described above are transferred to the exhaust flow path R of the thread groove pump step PS. The transferred gas molecules move toward the in-pump outlet port side flow path PR while being compressed from the transitional flow to the viscous flow by the drag effect generated by the rotation of the rotor 6. The gas molecules that reach the in-pump outlet port side flow path PR flow into the outlet port 3 and are exhausted to the outside of the casing 1 through the auxiliary pump which is not shown.

Detailed Configuration of Heating Means HM

Referring to FIGS. 2 and 3, the heating means HM has an electric circuit configuration in which the plurality of (six, specifically) resistance heating elements RE are connected in parallel to the pair of wiring lines WL1, WL2. Moreover, a thermostat is incorporated as an overheat prevention means 104 in this electric circuit configuration, and the position to incorporate the thermostat can be changed as needed.

The pair of wiring lines WL1, WL2 are arranged in such a manner as to surround an outer periphery of the rotating body RB inside the pump base 1B. The wiring line WL1 is connected to a power supply (ACC), not shown, whereas the wiring line WL2 is connected to the ground (GND).

The plurality of resistance heating elements RE are arranged radially at equal intervals around the rotating body RB inside the pump base 1B, and generate heat by being electrically energized, to intensively heat the vicinity of the exit of the exhaust flow path R in the thread groove pump step PS via the pump base 1B.

In the vacuum pump P1 shown in FIG. 1, the plurality of resistance heating elements RE are installed inside the pump base 1B due to the fact that the pressure is high in the vicinity of the exit of the exhaust flow path R and products are most likely to accumulate therein, and that the pump base 1B is located in the vicinity of the exit of the exhaust flow path R. However, the present disclosure is not limited to this installation example.

For example, the plurality of resistance heating elements RE may be installed inside the thread groove stator 9, or the plurality of resistance heating elements RE may be installed in a vacuum pump stator member other than the pump base 1B or thread groove stator 9.

In addition, the number of resistance heating elements RE is not limited to six and therefore can be increased or decreased as needed.

The vacuum pump P1 shown in FIG. 1 adopts a structure in which, for the purpose of improving the maintainability of the heating means HM such as replacing a faulty resistance heating element RE with a new one, the pair of wiring lines WL1, WL2 and the plurality of resistance heating elements RE are coupled by connectors CT (referred to as "connector coupling", hereinafter) so that the wiring lines WL1, WL2 and the plurality of resistance heating elements RE can each be attached and detached.

The vacuum pump P1 can also adopt a structure in which the pair of wiring lines WL1, WL2 and the plurality of resistance heating elements RE are directly connected without using the connectors CT (referred to as "direct connection structure", hereinafter). However, according to such a direct connection structure, in a case where a faulty resistance heating element RE is found using, for example, a current detection means which is prepared separately, and this faulty resistance heating element RE needs to be replaced with a new one, the entire heating circuit constituted by all the resistance heating elements RE and the pair of wiring lines WL1, WL2 needs to be removed. In this regard, the direct connection structure may not bring about good maintainability of the heating means HM.

The connector coupling described above, on the other hand, can bring about excellent maintainability of the heating means HM due to the fact that only the faulty resistance heating element RE can be removed from the pair of wiring lines WL1, WL2 by disconnecting the connectors CT.

In the vacuum pump P1 shown in FIG. 1, both end portions of the respective wiring lines WL1, WL2 are not coupled to each other. In another embodiment, however, both end portions of at least either one of the wiring lines (either WL1 or WL2) may be coupled by a coupling means CP as in the example shown in FIG. 4.

In this case, as the coupling means CP, the both end portions of the wiring line WL1 (or WL2) may be electrically conducted by adopting, for example, known connectors used for connecting electric wires. Alternatively, the both end portions of the wiring line WL1 (or WL2) may not be electrically conducted by adopting, as the coupling means CP, a coupling component other than the known connectors, such as hooks and rings that can be engaged with the hooks.

An advantage of the configuration adopting the coupling means CP described above is that fixing the end portions of the wiring lines WL1, WL2 by using the coupling means CP makes handling of the wiring lines WL1, WL2 easy when the wiring lines WL1, WL2 are arranged so as to surround the outer periphery of the rotating body RB inside the pump base 1B, improving the arrangement and workability of the wiring lines.

Referring to FIG. 2, the heating means HM is composed of the plurality of resistance heating elements RE and may include a current measuring means 101 for measuring the sum of values of flowing currents, a determination means 102 for determining the failure conditions of the plurality of resistance heating elements RE on the basis of the measured value obtained by the current measuring means 101 (referred to as a "failure condition determination means 102", hereinafter), and an output means 103 for outputting the failure conditions determined by the failure condition determination means 102 (referred to as a "failure condition output means 103", hereinafter).

A known current measuring device can be used as the current measuring means 101. Although in the example shown in FIG. 2, the current measuring means (current measuring device) is installed in the wiring line WL2 in order to measure the sum of the values of the currents flowing through the plurality of resistance heating elements RE, the present disclosure is not limited to this installation example; the current measuring means 101 may be installed on the wiring line WL1.

Note that, in the present embodiment, the operation of the vacuum pump P1 in a state in which all of the plurality of resistance heating elements RE are operated normally (state without failure) is referred to as "normal operation of the vacuum pump P1", and a current value Ip measured by the current measuring means during this normal operation of the vacuum pump P1 is referred to as "normal operation total current value Ip".

The failure condition determination means 102 determines "the number of faulty resistance heating elements RE" as an example of the failure conditions. This process for obtaining the number of faulty resistance heating elements RE is described hereinafter in "Process for obtaining current reduction rate X and the number S".

The failure condition output means 103 outputs the failure conditions (the number of faulty resistance heating elements RE) determined by the failure condition determination means 102 to, for example, a control means CM of the vacuum pump P1.

Control Means of Vacuum Pump P1

The control means CM of the vacuum pump P1 (referred to as a "pump control means CM", hereinafter) controls the operation of the vacuum pump P1 in an integrated manner, and includes various drive circuits DR for driving pump electrical components such as the radial magnetic bearings MB1, the axial magnetic bearings MB2, and the drive motor MO described above, a CPU for outputting operation start/stop commands to the various drive circuits DR, and a data storage unit ME including a ROM, a RAM, a hard disk, and the like.

Moreover, the pump control means CM controls the operation of the vacuum pump P1 by performing not only various determination processes such as determining whether the resistance heating elements RE need to be maintained or not, based on the failure conditions (the number of faulty resistance heating elements RE) output from the failure condition output means 103, but also immediately stopping the operation of the vacuum pump P1 when it is determined that the resistance heating elements RE need to be maintained. In order to perform such control, the normal operation total current value Ip that is described above is stored and recorded in advance in the data storage unit ME of the pump control means CM.

The normal operation total current value Ip may be recorded prior to shipment, or an actual total current value during normal operation of the heating means HM that is obtained immediately after the start of the operation of the vacuum pump P1 may be recorded as the normal operation total current value Ip.

Explanation of Control Operation of Vacuum Pump P1

Figure 5:
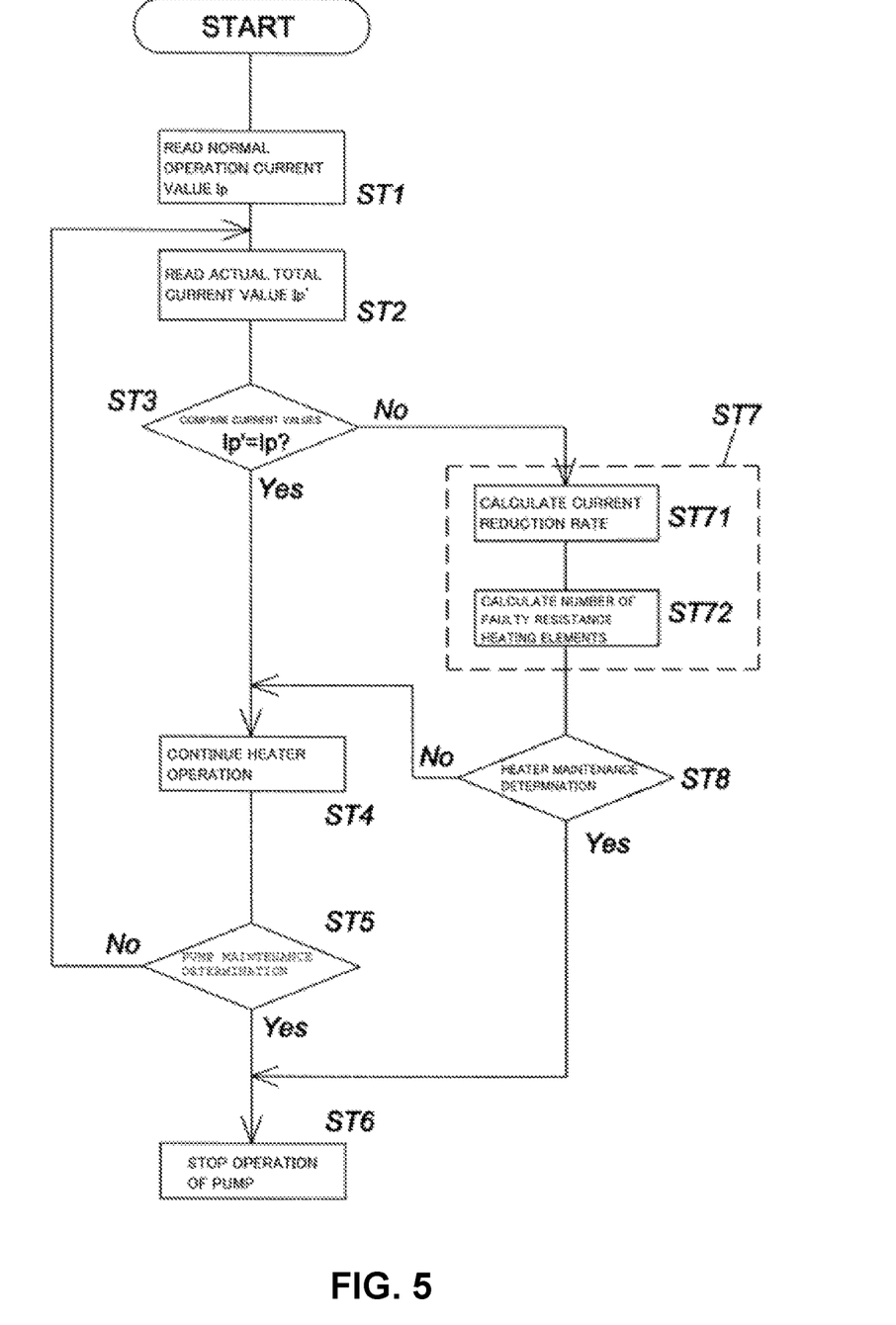
FIG. 5 is a flowchart showing operation control steps performed on the vacuum pump by a pump control means.

FIG. 5 is a flowchart showing operation control steps performed on the vacuum pump by the pump control means CM.

A series of operation control steps shown in the flowchart in FIG. 5 is triggered by, for example, the start of the operation of the vacuum pump P1, and, first, the normal operation total current value Ip is read from the data storage unit ME of the pump control means CM (ST1), then the sum of the values of the currents actually flowing through the plurality of resistance heating elements RE (referred to as "actual total current value Ip'", hereinafter) is measured by the current measuring means 101 (ST2), and thereafter the normal operation total current value Ip and the actual total current value Ip' are compared with each other (ST3).

As a result of the comparison in ST3 described above, when the normal operation total current value Ip is equal to the actual total current value Ip', the heating means HM continues to heat the exhaust flow path R by keeping the electrical conduction of the plurality of resistance heating elements RE and causing the plurality of resistance heating elements RE to generate heat (Yes in ST3, ST4).

Subsequently, information contributing to impeding the normal operation of the vacuum pump P1, such as a decrease in the internal temperature of the vacuum pump P1 or an increase in the amount of vibration due to the rotating body RB being unbalanced, is collected by various accompanying sensors of the vacuum pump P1, which are not shown, and on the basis of the collected information, it is determined whether the vacuum pump P1 needs to be maintained or not (referred to as "pump maintenance determination", hereinafter) (ST5).

When it is determined in the pump maintenance determination of ST5 described above that "the vacuum pump P1 does not need to be maintained", the process returns to ST2 (No in ST5), but when it is determined that "the vacuum pump P1 needs to be maintained", the operation of the vacuum pump P1 is stopped (ST6).

As a result of the comparison in ST3 described above, when the normal operation total current value Ip is not equal to the actual total current value Ip', a process for determining the conditions of the resistance heating elements RE of the heating means HM (the number of faulty resistance heating elements RE) is performed (referred to as "heater condition determination process", hereinafter) (ST7).

Then, on the basis of the conditions of the resistance heating elements RE determined in ST7 (the number of faulty resistance heating elements RE), a process for determining whether the resistance heating elements RE need to be maintained or not (referred to as "heater maintenance determination process", hereinafter) is performed (ST8).

When it is determined in ST8 described above that "the heater maintenance is not necessary", the process shifts to ST4 (No in ST8), but when it is determined that "the heater maintenance is necessary", the operation of the vacuum pump P1 is stopped (ST6).

Details of Heater Condition Determination Process of ST7

The heater condition determination process of ST7 calculates the current reduction rate X (ST71) and obtains the number S (integer) of faulty resistance heating elements RE on the basis of the calculated current reduction rate X (ST72). This process for calculating the current reduction rate X and the process for obtaining the number S of faulty resistance heating elements RE are described hereinafter in "process for obtaining the current reduction rate X and the number S".

Process for Obtaining Current Reduction Rate X, Number S

Assuming that the current reduction rate is X, the current reduction rate X can be determined by the following expression (1).

$$X=(Ip-Ip')/Ip \qquad \text{Ex. (1)}$$

Also, assuming that the number of faulty resistance heating elements RE is S (integer) and the total number of resistance heating elements RE is N, the number S (integer) is obtained by the following expression (2) on the basis of the current reduction rate X.

$$(S-1)/N < X \leq S/N \qquad \text{Ex. (2)}$$

The following expression (3) is obtained by modifying the right side of the expression (2).

$$N \cdot X \leq S \qquad \text{Ex. (3)}$$

The following expression (4) is obtained by modifying the left side of the expression (2).

$$S < N \cdot X + 1 \qquad \text{Ex. (4)}$$

The number S of faulty resistance heating elements RE satisfies the conditions of the expressions (3) and (4), i.e., the condition of the following expression (5).

$$N \cdot X \leq S < N \cdot X + 1 \qquad \text{Ex. (5)}$$

Here, for example, assuming that the total number N of resistance heating elements RE is 10, that the normal operation total current value Ip is 10 amperes, and that the actual total current value Ip' is 8.2 amperes, the current reduction rate X (=(Ip-Ip')/Ip) is 0.18 (=(10-8.2)/10=0.18). By substituting this current reduction rate X (=0.18) and the total number N of resistance heating elements RE (=10) into the expression (5), the expression (5) becomes the following expression (6). The expression (6) below can determine that the number S (integer) of faulty resistance heating elements RE is two.

$$1.8 \leq S < 2.8 \qquad \text{Ex. (6)}$$

Details of Heater Maintenance Determination Process of ST8

The heater maintenance determination process of ST8 calculates the failure rate of the resistance heating elements RE (=the number S of faulty resistance heating elements/the total number N of resistance heating elements), and determines that "the heater maintenance is necessary" when the calculated failure rate is greater than a reference failure rate that is set in advance (referred to as "reference failure rate", hereinafter) or determines that "the heater maintenance is not necessary" in other situations (ST8).

For example, when it is assumed that the operation of the vacuum pump P1 has no problem as long as 80% or more of the total number of resistance heating elements RE are operated normally, and when the condition of the following expression (7) is satisfied on the assumption that the reference failure rate is 0.2, it may be determined that "the heater maintenance is necessary", and an alarm for urging the maintenance is output to issue a maintenance request warning (ST8).

$$0.2 < S/N \qquad \text{Ex. (7)}$$

S: The number of faulty resistance heating elements
N: Total number of resistance heating elements

Stopping Vacuum Pump P1 in ST6

When stopping the vacuum pump P1 in ST6, for example, the pump control means CM performs processes necessary for stopping the operation of the vacuum pump P1, such as outputting an operation stop command from the CPU of the pump control means CM to various drive circuits for driving the pump electrical components such as the radial magnetic bearings MB1, the axial magnetic bearings MB2, and the drive motor MO (ST6).

According to the vacuum pump P1 of the present embodiment described above, as a specific configuration, the heating means HM adopts the electric circuit configuration in which the plurality of resistance heating elements RE are connected in parallel to the pair of wiring lines WL1, WL2. Therefore, even if any one of the plurality of resistance heating elements RE breaks down, the rest of the heating resistance elements can be operated normally and the exhaust flow path R can constantly be heated by these normal resistance heating elements. Accordingly, owing to the fact that deposition of products in the exhaust flow path R can be prevented by such continuous heating, the present disclosure is suitable for prolonging the life of the heating means HM used as a measure to prevent product deposition in the vacuum pump P1.

Furthermore, according to the vacuum pump P1 of the present embodiment, even if, for example, any one of the resistance heating elements breaks down, the exhaust flow path R can constantly be heated, preventing deposition of products in the exhaust flow path R, as described above. Therefore, the present disclosure also has the advantage that the operation of a device to be vacuumed by the vacuum pump P1, that is, for example, a process apparatus in a semiconductor manufacturing apparatus, can be continued.

The heating means HM constituting the vacuum pump P1 of the present embodiment described above may be configured as a heating device separate from the vacuum pump P1

The present disclosure is not limited to the embodiments described above, and many modifications can be made by those having ordinary knowledge in the art within the technical concept of the present disclosure.

REFERENCE SIGNS LIST

1 Casing
1A Pump case
1B Pump base
2 Inlet port
3 Outlet port
4 Stator Column
5 Rotor shaft
6 Rotor
7 Rotor blade
8 Stator blade
9 Thread groove stator
91 Thread groove
101 Current measuring means
102 Determination means (failure condition determination means)
103 Output means (failure condition output means)
104 Overheat prevention means
CM Control means (pump control means)
CP Coupling means
CT Connector
DR Various drive circuits
GE Final gap
HM Heating means
MB1 Radial magnetic bearing
MB2 Axial magnetic bearing
ME Data storage unit
MO Drive motor
P1 Vacuum pump
PS Thread groove pump step
RB Rotating body
PT Exhaust step
PT1 Top exhaust step
PTn Bottom exhaust step
PR In-pump outlet port side flow path
R Exhaust flow path
RE Resistance heating element
WL1, WL2 Wiring lines

What is claimed is:

1. A vacuum pump that exhausts gas by rotation of a rotating body, the vacuum pump comprising:
an exhaust flow path for exhausting the gas; and
a heating means for heating the exhaust flow path, wherein:
the heating means includes a plurality of resistance heating elements connected in parallel to a pair of wiring lines, wherein each respective resistance heating element of the plurality of resistance heating elements connects to the pair of wiring lines,
the plurality of resistance heating elements are arranged at intervals around the rotating body,
each respective resistance heating element of the plurality of resistance heating elements have respective connectors, configured to be attached and detached,
the pair of wiring lines and the respective resistance heating element is coupled by the respective connectors, and
a control means configured to:
control an operation of the vacuum pump, and
determine that heater maintenance is not necessary and continue the operation of the vacuum pump when a number of respective resistance heating element failures is smaller than a predetermined reference failure number.

2. The vacuum pump according to claim 1, further comprising:
a current measuring device for measuring a sum of values of currents flowing through the plurality of resistance heating elements, wherein the number of respective resistance heating element failures out of the plurality of resistance heating elements is determined on the basis of a measured value obtained by the current measuring device.

3. The vacuum pump according to claim 1, wherein the control means is further configured to:
determine that the number of respective resistance heating element failures is greater than the predetermined reference failure number, and
issue a maintenance request warning.

4. The vacuum pump according to claim 1, wherein both end portions of at least either one of the pair of wiring lines are coupled.

5. A heating device for a vacuum pump that includes the heating means in the vacuum pump according to claim 1.

6. The vacuum pump according to claim 3,
wherein a failure rate is based on the number of respective resistance heating element failures, and
wherein the control means is further configured to, in response to determining that the failure rate is greater than the predetermined reference failure number, determine that the vacuum pump needs to be maintained, and stop the operation of the vacuum pump.

7. The vacuum pump according to claim 1, wherein the control means is configured to:

based on the number of respective resistance heating element failures, determine that at least one resistance heating element has failed, and based on the comparison of a failure rate to a predetermined reference failure number, determine that heater maintenance is not necessary and continue operation of the vacuum pump, wherein a failure rate is based on the number of respective resistance heating element failures.

8. The vacuum pump according to claim 1, wherein a predetermined reference failure rate is based on the predetermined reference failure number, and the predetermined reference failure rate is 80%.

9. The vacuum pump according to claim 1, wherein the control means is configured to, based on the number of respective resistance heating element failures, determine that at least one resistance heating element has failed, and wherein the predetermined reference failure number is based on any remaining resistance heating elements are operated normally and the exhaust flow path is constantly heated by these remaining resistance heating elements, such that deposition of products in the exhaust flow path is prevented by such continuous heating.

\* \* \* \* \*